United States Patent [19]

Porter

[11] 4,234,045
[45] Nov. 18, 1980

[54] HARVESTING MACHINE FEEDER APPARATUS

[75] Inventor: John R. Porter, Waterloo, N.Y.

[73] Assignee: Porter-Way Harvester Manufacturing Co., Inc., Waterloo, N.Y.

[21] Appl. No.: 962,284

[22] Filed: Nov. 20, 1978

[51] Int. Cl.³ .................... A01D 17/04; A01D 46/00
[52] U.S. Cl. ................................. 171/14; 56/327 R
[58] Field of Search .............. 171/14, 120; 56/328 R, 56/327 R

[56] References Cited

U.S. PATENT DOCUMENTS

| | | | |
|---|---|---|---|
| 1,131,465 | 3/1915 | Brandt | 171/14 |
| 2,073,041 | 3/1937 | Wolter | 171/120 |
| 2,400,667 | 5/1946 | Toews | 198/688 |
| 2,452,418 | 10/1948 | Zuckerman | 171/120 |
| 2,747,354 | 5/1956 | Bloser | 171/120 |
| 3,078,926 | 2/1963 | Ries et al. | 171/14 |
| 3,340,935 | 9/1967 | Csimma | 171/14 |
| 3,810,512 | 5/1974 | Porter | 171/14 |
| 3,990,217 | 11/1976 | Aoyama | 171/14 |
| 3,999,613 | 12/1976 | Porter | 171/14 |
| 4,186,465 | 5/1979 | Porter | 171/14 |

Primary Examiner—Paul J. Hirsch
Attorney, Agent, or Firm—Charles S. McGuire

[57] ABSTRACT

Apparatus for use in conjunction with prior art machines for harvesting tomatoes, and the like. The prior art harvesting machine includes a pair of counter-rotating discs for picking up vines and fruit and delivering them rearwardly to an upright feed conveyor. The present invention comprises an endless, overhead, feed-assist belt with outwardly extending cleats having a forward, lower end extending over the discs and a rear, upper end supported in spaced relation to the upright feed conveyor, preferably about half way up the length thereof. The structure and physical arrangement of the feed assist belt provide improved efficiency of the machine by decreasing the amount of lost fruit and reducing the tendency of the machine to become clogged by vines or weeds.

8 Claims, 6 Drawing Figures

HARVESTING MACHINE FEEDER APPARATUS

BACKGROUND OF THE INVENTION

The present invention relates to harvesting machinery and, more specifically, to improved apparatus for conveying through a harvesting machine crops including both unusable vine portions and usable portions to be separated therefrom.

Prior U.S. Pat. Nos. 3,810,512 and 3,999,613 disclose a machine for harvesting tomatoes, or similar crops, by removing the plants and fruit from the ground, shaking the vines to remove the fruit, and transporting the crop to a final discharge conveyor. A number of conveyors, each comprising spaced, parallel rods or links joined at their ends to endless belts having spaced lugs or cleats on the inner side for engagement by cogs on drive or idler wheels, are employed for transporting the materials through the harvesting machine. An improvement comprising structure for assisting in the removal of dirt, small rocks, spoiled or damaged fruit, etc., from the harvested fruit prior to discharge from such harvesting machines is described in U.S. Pat. No. 4,089,421. Mechanism for use in the same type harvesting machine for keeping the open-link conveyors essentially free of foreign materials is disclosed in copending application Ser. No. 821,790 now U.S. Pat. No. 4,156,465.

The present invention is concerned with harvesting machinery of the same type as that discussed in each of the aforementioned patents and pending application. In particular, the invention is directed to the portion of such machinery whereby the crop, including both usable and unusable portions, is initially picked up from ground level and directed rearwardly to the shaker or crop-vine separation section. It is this portion of the machine which is most susceptible to clogging from vines or weeds becoming entangled in various moving parts. Also, it is this section from which vines may be dropped and lost prior to removal and recovery of the crop.

Accordingly, it is a principal object of the present invention to provide apparatus for improving the operation and efficiency of harvesting machines of the aforementioned type.

More specifically, it is an object of the invention to provide improved means for picking up a crop including both unusable vine portions and produce to be recovered therefrom and effecting initial transport thereof into a harvesting machine which minimizes both lost produce and the tendency of the apparatus to become clogged with vines or weeds.

Other objects will in part be obvious and will in part appear hereinafter.

SUMMARY OF THE INVENTION

The apparatus of the present invention is mounted upon the forward section of harvesting machines of the general type disclosed in the aforementioned patents. Such machines include a pair of overlapped, counter-rotating discs having notched edges for engaging plant stems to pull the plants free from the roots and direct the vines and produce rearwardly to conveying portions of the machine. The initial conveying portion comprises an endless chain having parallel bars spaced by a distance small enough that produce of a predetermined minimum size cannot fall through. The crop, including both vines and produce, is deposited by the discs upon the forward end of this chain and conveyed thereby upwardly and rearwardly into the shaker section of the machine wherein vines and produce are separated.

The apparatus of the present invention comprises an endless, solid belt having a plurality of transverse cleats extending outwardly therefrom at spaced intervals. The cleats are attached to or formed integrally with the belt, being in the nature of rectangular flaps, of the same width as the belt, relatively thin and several inches in height. The belt is supported for rotation about appropriate framework which is mounted upon the forward section of the harvesting machine with the lower reach of the belt approximately parallel to and spaced from the upper reach of said conveyor chain.

The belt is only about half the width of the chain and centrally disposed, laterally thereof. The forward, lower end of the belt extends over the counter-rotating discs, whereby vines and weeds are engaged by the cleats on the belt and pulled rearwardly from the discs to the upright feed chain. The belt extends for about half the length of the chain, serving to hold large vines in contact with the belt and continuing to assist in pulling the vines upwardly and rearwardly as the crop is transported toward the shaker section.

Mechanism is provided for imparting high frequency vibrations to the upright feed chain at a point thereon between the upper end of the overhead belt and the upper end of the chain. Thus, a good deal of the fruit is separated from the vines prior to being discharged into the shaker section. The action of the overhead belt reduces the tendency of vines to wrap around the mechanism which rotates the discs, as well as assisting in feeding the vines to and along the upright feed chain, minimizing the amount of crop inadvertently dropped and lost.

DETAILED DESCRIPTION

Figure 1:
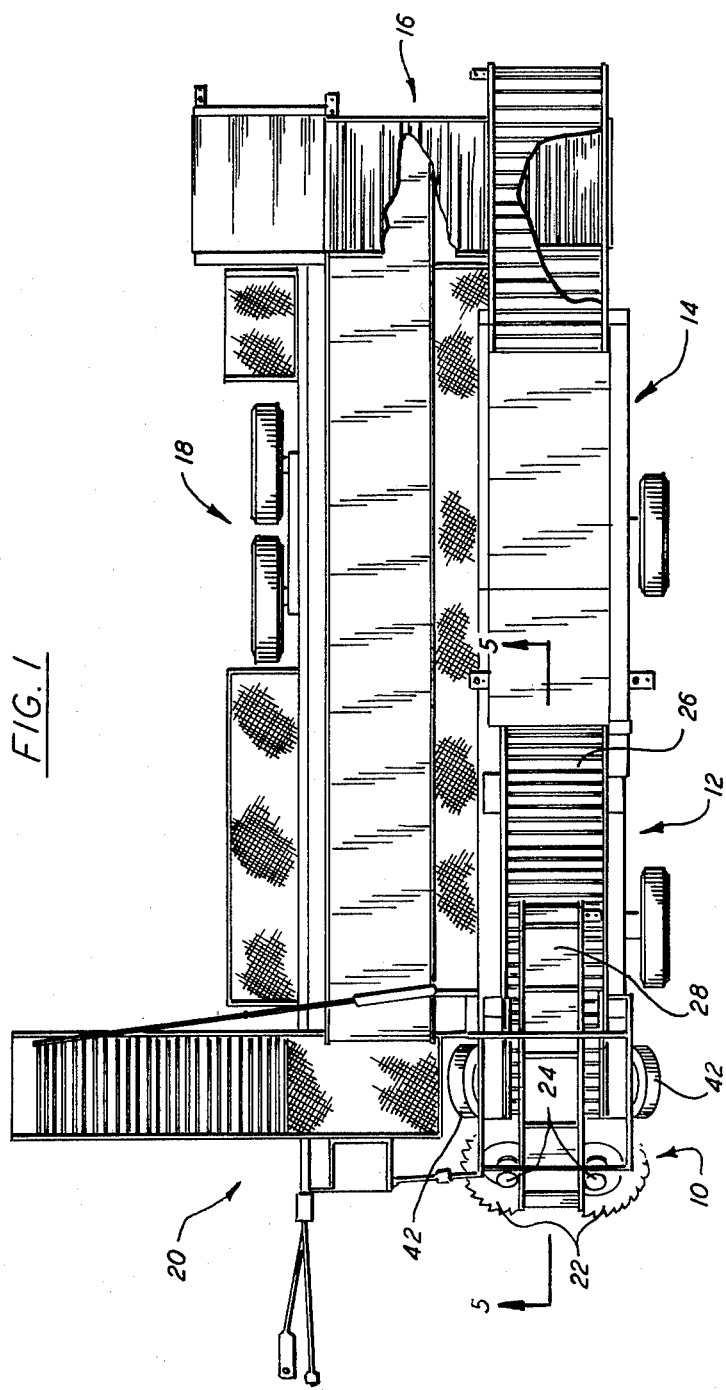
FIG. 1 is a plan view of a harvesting machine incorporating the improvements of the present invention.

The harvesting machine shown in FIG. 1 is adapted to be pulled by a tractor, or similar vehicle, with various belts, shafts and other operating parts being driven during operation of the harvester by hydraulic motors which receive pressurized fluid from pumps powered by the tractor power take-off unit in conventional fashion. The harvesting machine is comprised generally of header section 10, upright feed section 12, shaker section 14, rear lateral conveyor section 16, sorting section 18 and discharge section 20. Details of construction and operation of all elements of the harvester, excepting those of the present invention, may be found in the aforementioned U.S. patents.

A pair of overlapping discs 22 having notched peripheries are mounted on header section 10 and are driven in opposite directions about parallel axes by hydraulic motors 24. The axes of mounting and rotation of discs 22 are inclined forwardly at the top and the adjustable mechanism controlling the height of the discs is positioned so that the forward disc edges are slightly below ground level when the machine is in use. Thus, as the machine is pulled through a field of, e.g., tomato plants with the forward edges of the discs rotating toward one another, plants with fruit attached and loose fruit are discharged from the rear edges of discs 22 onto the lower, forward end of endless conveyor 26, together with any dirt, rocks and other materials which may be picked up along with the crop. Conveyor 26 is of the so-called cogged belt type, being made up of parallel links or rods connected at their ends, in substantially evenly spaced relation to a pair of endless belts having spaced lugs or cogs along their inside surfaces for engagement with the teeth of the drive sprocket. As also seen in FIG. 1, belt 28, with which the present invention is principally concerned, is supported above the central portion of discs 22 and of a portion of conveyor 26, as explained later in more detail.

Figure 2:
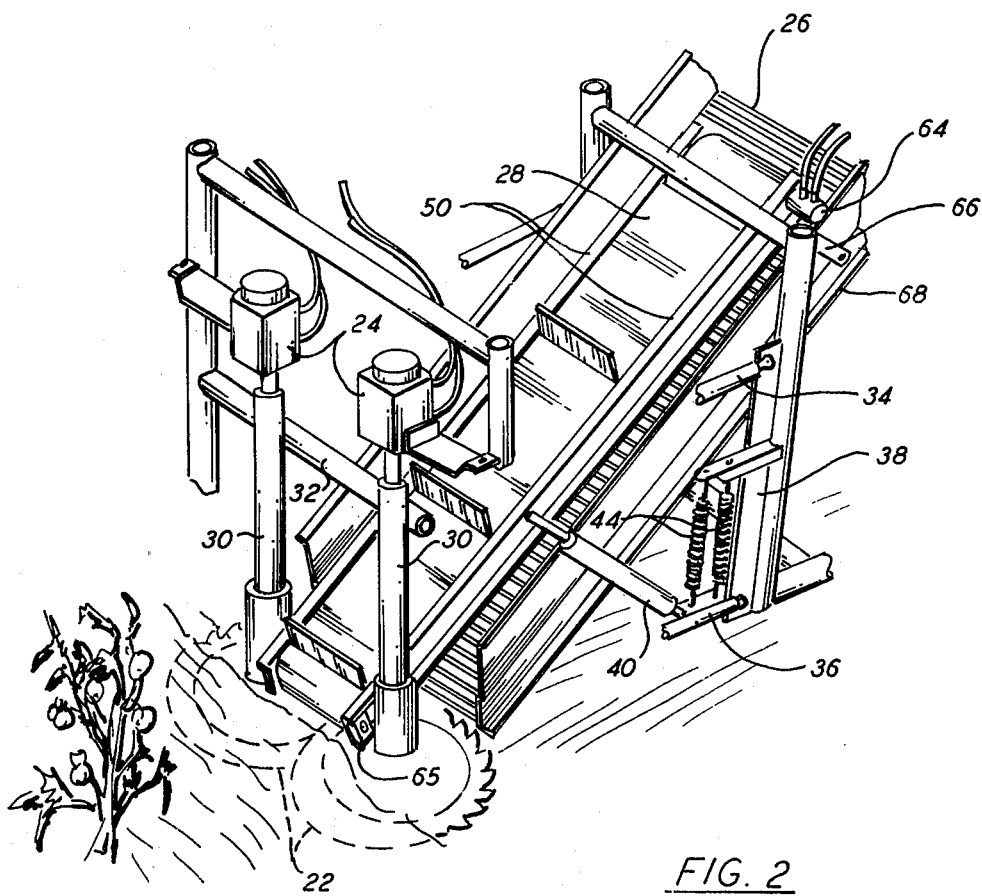
FIG. 2 is a fragmentary, perspective view of the front portion of the machine.
Figure 3:
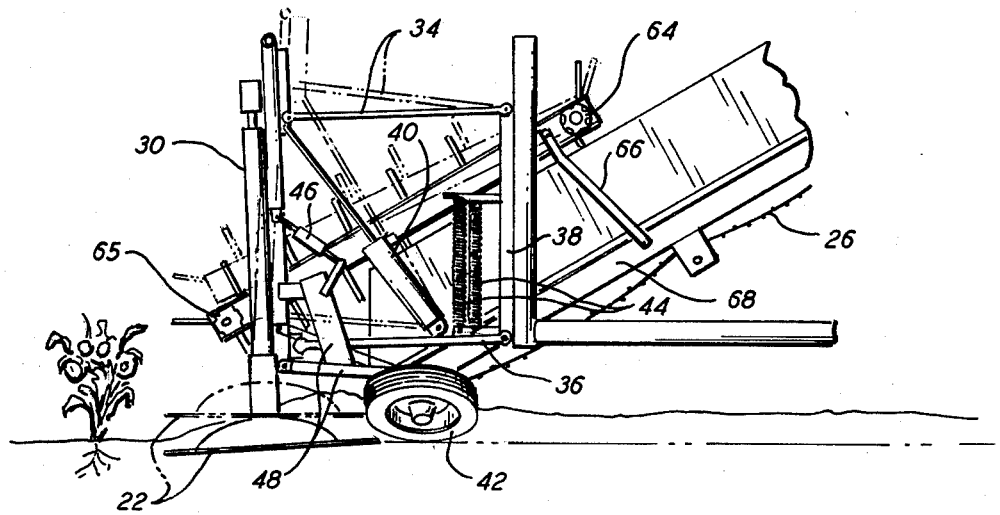
FIG. 3 is a fragmentary, side elevational view of a forward portion of the machine of FIG. 1.

Turning now to FIGS. 2 and 3, the various elements for supporting and positioning the discs and other portions of header section 10 are shown in greater detail. Sleeves 30, within which the drive shafts of discs 22 rotate, are fixedly attached to horizontal element 32 of the header support frame which includes upper and lower rods 34 and 36, respectively, each pivotally attached at one end to portion 38 of the rigid main frame, forming a parallelogram linkage between the header section and main frame. Hydraulic cylinder 40 is selectively actuable to raise and lower the entire header assembly between the operative position of discs 22, shown in solid lines in FIG. 3 with the forward edges below ground level, and an inoperative position, shown in phantom lines, wherein the discs are held above ground level so that the harvesting machine may be moved when not performing a harvesting operation.

When in the operative position, header section 10 is supported upon wheels 42, one of which is seen in FIG. 3. Preferably the wheel axels are inclined, as indicated in the drawing, so that the wheels make contact with the ground approximately in alignment with the forward-to-rear centerline of each disc, thereby providing better control of disc height in relation to the terrain being covered, since the wheels ride upon the level cut made by the blades. Springs 44 assist in supporting the weight of header section 10 when in the operative position. The angle of tilt of the disc axles may be adjusted by changing the effective length of upper rods 34 which include for such purpose two telescoping sections which may be selectively clamped in any desired relative position. The depth of cut, i.e., the relative vertical position of discs 22 in the operative position, may be adjusted by means of screw jack 46 which is connected to wheel support linkage 48.

Figure 4:
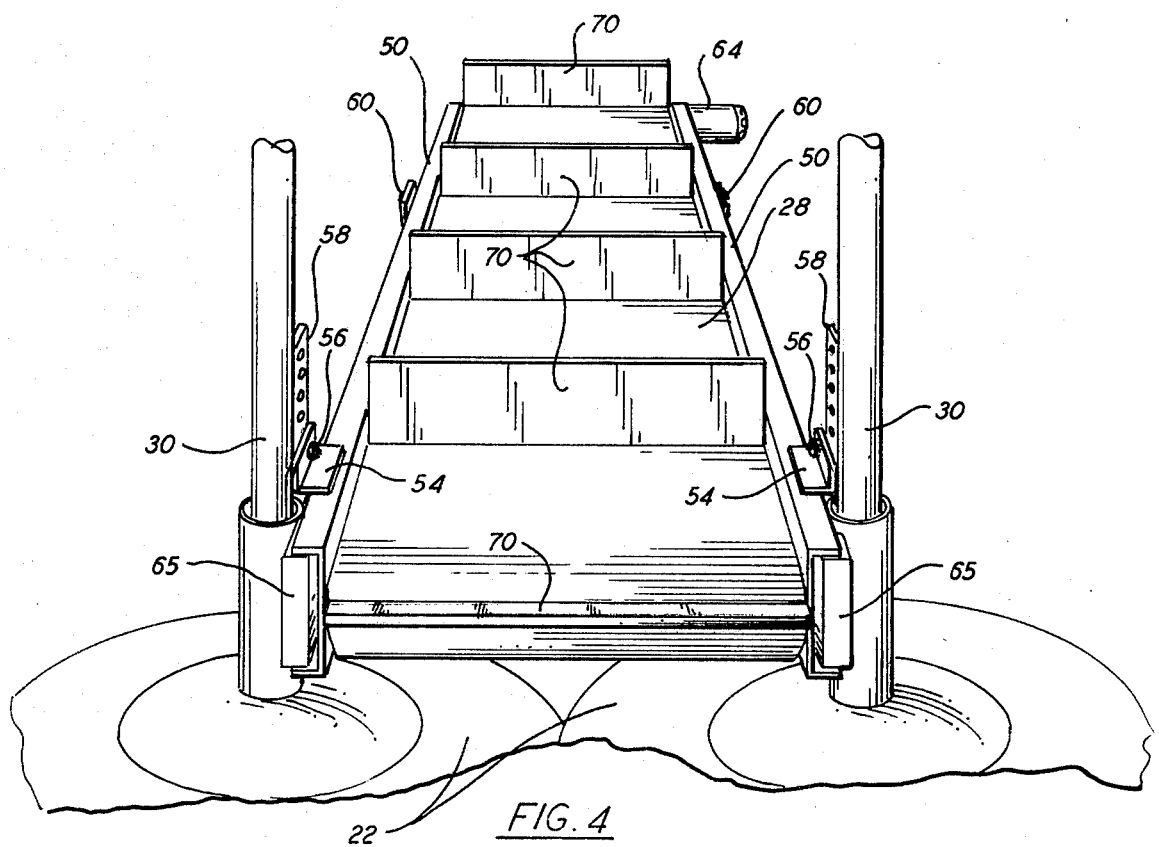
FIG. 4 is a front elevational view of portions of the machine shown in FIGS. 2 and 3.

Header section 10 and upright feed section 12 are modified by the incorporation therewith of the apparatus of the present invention, which will now be described in more detail. A pair of side support elements in the form of channel members 50 extend along the sides of belt 28 for its full length and support therebetween a pair of essentially planar plates 52 upon which the upper and lower reaches of the belt ride. Channel members 50 are affixed at their forward ends by means of brackets 54 and bolts 56 to plates 58 which in turn are welded to sleeves 30, all as best seen in FIG. 4. Plates 58 are provided with a plurality of holes for selective adjustment of the forward, lower end of belt 28 relative to conveyor 26.

Belt 28 is supported for rotation about idler roll 60 and powered roll 62 (FIG. 5), the latter being driven by hydraulic motor 64. Idler roll 62 is supported in adjustable bearings 65 for adjustment of the tension of belt 28. The rear or upper ends of channel members 50 are supported by rigid straps 66, each attached at one end to one of channel members 50 and at the other to side frame members 68 of upright feed section 12. At least one of the end connections of straps 66 is such as to allow the pivotal movement required as header section 10 is moved between the operative and inoperative positions described earlier. Straps 66 are angled inwardly toward their upper ends as required to accommodate the difference in width between conveyor 26 and belt 28.

A plurality of flaps or cleats 70 extend outwardly from belt 28 at intervals of several inches or about one foot. Cleats 70 are preferably formed integrally with belt 28 from molded hard rubber, for example, thereby having some degree of flexibility although being relatively stiff. As shown, cleats 70 have a width equal to that of belt 28, extending therefrom for a distance of, e.g., 3 to 4 inches. Belt 28 is driven by motor 64 in the direction opposite to that in which conveyor 26 is driven by its respective drive motor. Thus, the upper reach of conveyor 26 and lower reach of belt 28 both travel in an upward direction, preferably at a speed slightly greater than the speed of forward travel of the harvesting machine. The distance between the opposing surfaces of belt 28 and conveyor 26 is preferably about 14 inches, making the distance from the outer edges of cleats 70 to conveyor 26 about 10 inches.

Figure 5:
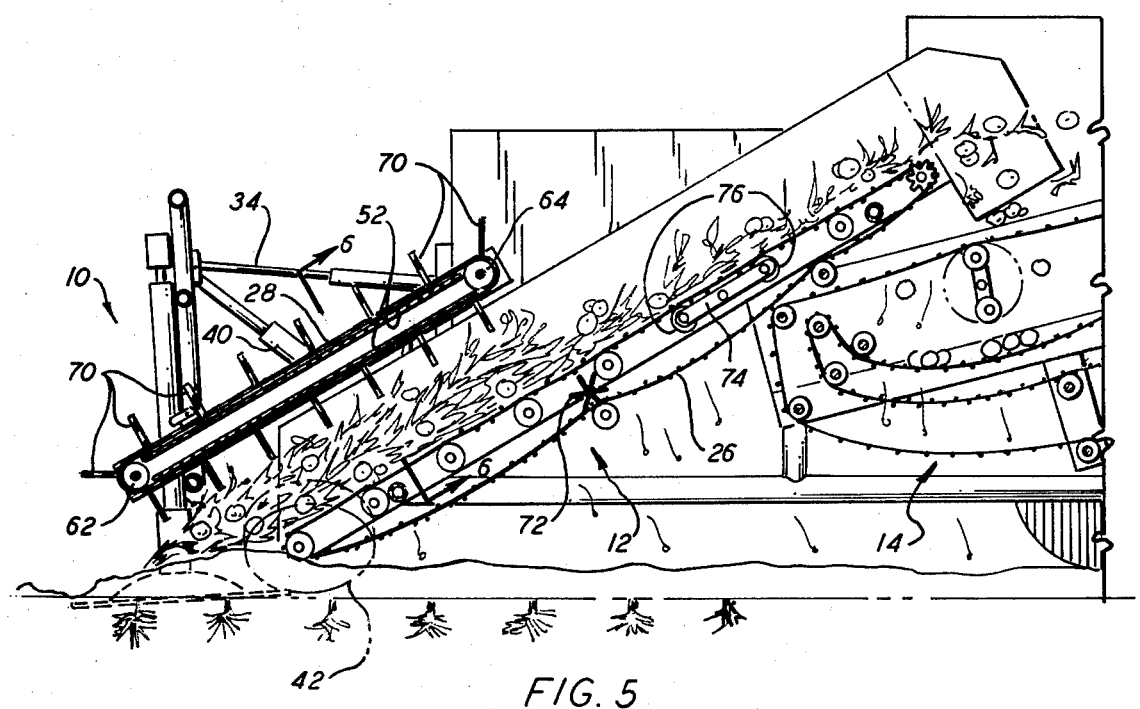
FIG. 5 is a fragmentary, side elevational view in section on the line 5—5 of FIG. 1.
Figure 6:
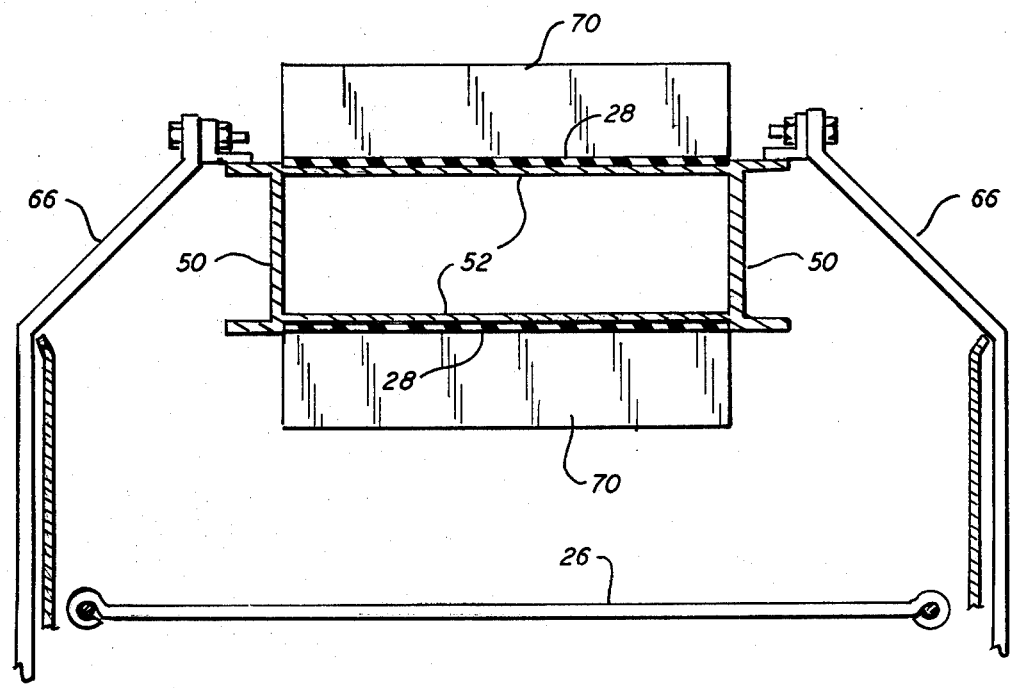
FIG. 6 is a front elevational view in section on the line 6—6 of FIG. 5.

As seen in FIG. 5, mounted between the upper and lower reaches of conveyor 26 are rotating cleanout device 72 and oscillating arm 74. These devices and others like them are fully described in aforementioned application Ser. No. 821,790. Arm 74 is pivotally mounted at its center and carries a roller 76 mounted for free rotation at each end. A suitable drive motor is connected through a Pitman bearing assembly to arm 74 to impart rotation thereto alternately in opposite directions. Arm 74 is mounted at one lateral side of conveyor 26, directly below the upper reach of conveyor 26 for alternate contact therewith of rollers 76 as arm 74 oscillates. Arm 74 is preferably mounted at its center upon a shaft which extends laterally across conveyor 26, in spaced relation to the lower reach thereof, and a second arm carrying rollers at each end is mounted on the shaft adjacent the other side of the conveyor.

All of the foregoing structure concerning the oscillating arm(s) is shown and described in more detail in application Ser. No. 821,790, now U.S. Pat. No. 4,156,465 in connection with operation thereof to assist in dislodging foreign matter from between the links of conveyor chain 26. However, it has also been found that the high frequency vibrations imparted to conveyor 26 by the oscillating arms assists in dislodging the fruit from the vines prior to entering shaker section 14. The use of the overhead feed belt of the present invention in conjunction with an upright feed conveyor equipped with oscillating arms to impart high frequency vibrations thereto, allows a good percentage of the tomatoes to be separated from the vines and pass directly through the shaker belt to the fruit belt immediately after entering the shaker section. Very little fruit is lost either by falling out of the harvesting machine or by being

United States Patent [19]

Haynes

[11] 4,234,046
[45] Nov. 18, 1980

[54] PRESSURE DIFFERENTIAL SEAFLOOR CORER-CARRIER

[76] Inventor: Harvey H. Haynes, 690 Mesa Dr., Camarillo, Calif. 93010

[21] Appl. No.: 34,220

[22] Filed: Apr. 30, 1979

[51] Int. Cl.³ .............................................. E21B 7/12
[52] U.S. Cl. .......................................... 175/6; 175/58
[58] Field of Search ...................... 175/5, 6, 8, 9, 58, 175/59, 60, 94, 381, 213, 217, 218; 114/295, 296; 405/224, 225; 173/91

[56] References Cited

U.S. PATENT DOCUMENTS

| | | | |
|---|---|---|---|
| 2,678,203 | 5/1954 | Huff | 175/213 |
| 3,306,110 | 2/1967 | Woods | 175/58 X |
| 3,438,452 | 4/1969 | Bernard et al. | 175/6 |
| 3,496,900 | 2/1970 | Mott et al. | 114/296 |
| 3,585,738 | 6/1971 | De Koning | 175/6 X |
| 3,603,408 | 9/1971 | Smulders | 175/6 |
| 3,701,387 | 10/1972 | Koot | 175/6 |
| 3,741,920 | 6/1973 | Hilfing | 175/85 X |
| 3,928,982 | 10/1975 | Lacroix | 405/224 |
| 4,036,161 | 7/1977 | Nixon | 114/296 |
| 4,043,407 | 8/1977 | Wilkins | 175/58 X |

FOREIGN PATENT DOCUMENTS 656837 2/1938 Fed. Rep. of Germany .......... 175/217

Primary Examiner—James A. Leppink
Assistant Examiner—Richard E. Favreau
Attorney, Agent, or Firm—Richard S. Sciascia; Joseph M. St. Amand

[57] ABSTRACT

A pressure differential seafloor corer-carrier for obtaining long core samples of seafloor sediments. The corer-carrier is composed of two main components: The first component is a pump assembly that pumps seawater and sediment as to create a negative pressure differential; the negative pressure differential being the driving force that forces the corers into the seafloor such that cores of over 100 feet in length can be obtained. The second component is a space frame mounted and fastened to the pump and functions as a rack to which conventional corers are attached. Once the corers are embedded to their full length, the pump is used to create a positive pressure differential which helps remove the corer-carrier from the seafloor.

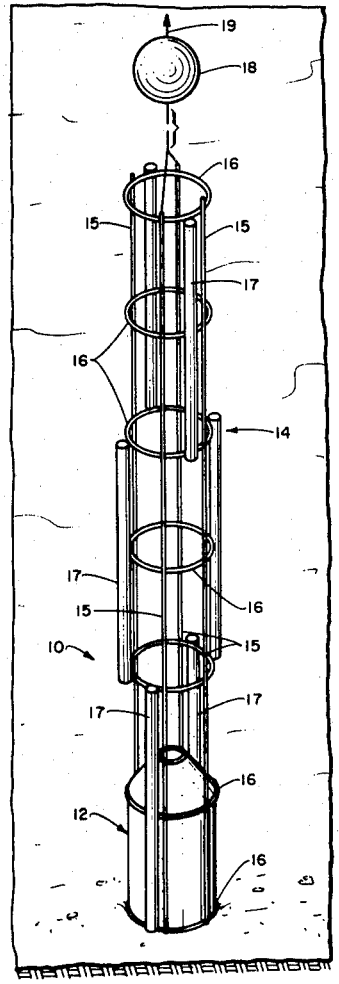

14 Claims, 2 Drawing Figures